United States Patent
Koga

[15] 3,704,564
[45] Dec. 5, 1972

[54] METHOD OF FABRICATING STRUCTURAL BLOCK ASSEMBLIES

[72] Inventor: Motoyuki Koga, Tokyo, Japan
[73] Assignee: Hakko Co., Ltd., Tokyo, Japan
[22] Filed: Dec. 29, 1969
[21] Appl. No.: 888,262

[52] U.S. Cl. .................... 52/747, 52/309, 52/428
[51] Int. Cl. ............................................. B04g 21/14
[58] Field of Search ............. 52/415, 420, 426–428, 52/430, 140, 366, 392, 449, 127, 123, 309, 611, 593, 747, 173; 156/295

[56] References Cited

UNITED STATES PATENTS

| | | | |
|---|---|---|---|
| 3,357,137 | 12/1967 | Lombardi et al. | 52/309 |
| 3,376,682 | 4/1968 | Briscoe | 52/173 |
| 3,439,406 | 4/1969 | Wallin | 52/309 |
| 3,590,540 | 7/1971 | Johnson | 52/309 |
| 2,130,231 | 9/1938 | Forciea | 52/233 |
| 3,444,023 | 5/1969 | Shockey | 156/295 |
| 1,959,322 | 5/1934 | Wedger | 156/295 |
| 1,881,438 | 10/1932 | Fischer | 52/420 |
| 2,666,402 | 1/1954 | Clarvoe | 52/420 |
| 2,915,893 | 12/1959 | Wilkins | 52/611 |
| 3,298,144 | 1/1967 | Fischer | 52/98 |
| 3,308,585 | 3/1967 | Fischer | 52/309 |
| 3,416,276 | 12/1968 | Caputo et al. | 52/436 |
| 3,418,767 | 12/1968 | Seeger | 52/127 |

FOREIGN PATENTS OR APPLICATIONS

| | | | |
|---|---|---|---|
| 456,471 | 11/1936 | Great Britain | 52/173 |
| 121,475 | 6/1946 | Australia | 52/747 |
| 358,560 | 10/1931 | Great Britain | 156/295 |
| 241,044 | 7/1960 | Australia | 52/415 |
| 300,487 | 10/1954 | Switzerland | 52/415 |

OTHER PUBLICATIONS

Concrete Products 3/68 "Monowall and Threadline: Block's Two–X Fisted Marketing Punch," by William J. Blaha.

*Primary Examiner*—Frank L. Abbott
*Assistant Examiner*—Leslie A. Braun
*Attorney*—George B. Oujevolk

[57] ABSTRACT

Structural blocks are bonded together by interposing between them an elastic foamed body impregnated with a flowable binder, applying a pressure to the foamed body to squeeze out the impregnated binder in the gap between blocks and then causing the binder to set.

2 Claims, 20 Drawing Figures

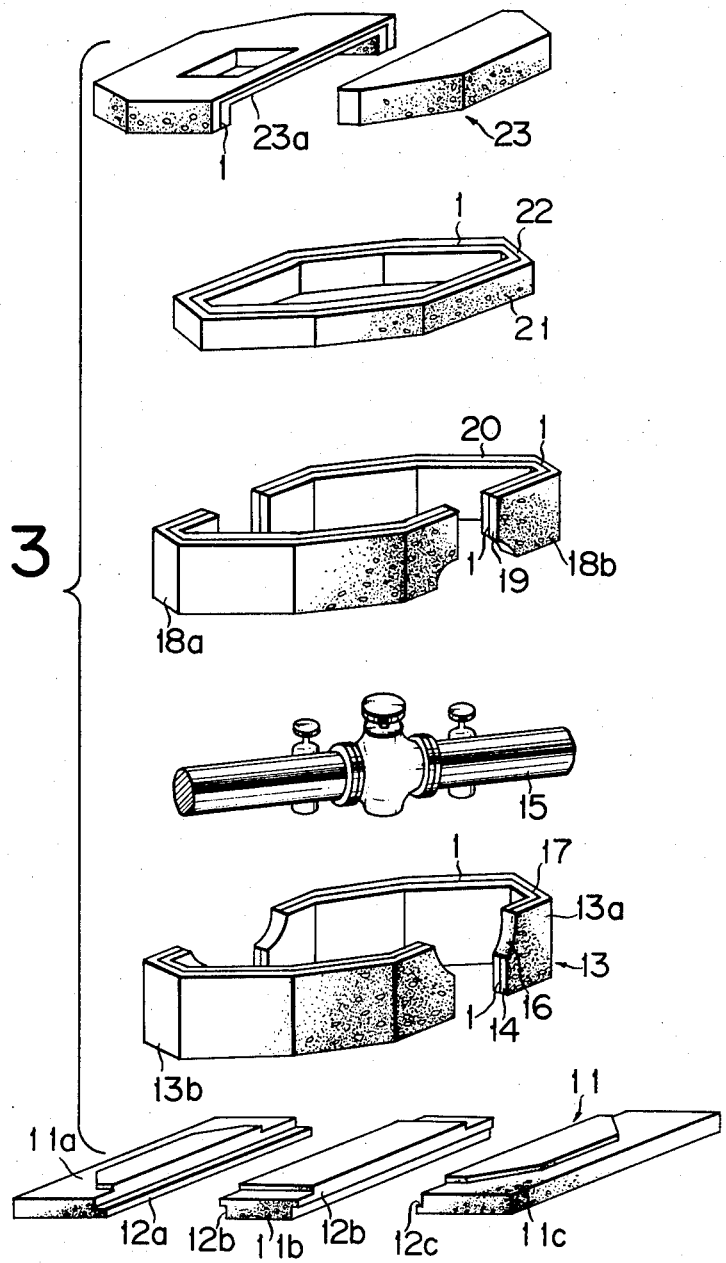

METHOD OF FABRICATING STRUCTURAL BLOCK ASSEMBLIES

This invention relates to a structural block assembly and a method of fabricating the same, and more particularly to an assembly comprising structural blocks such as various concrete segments utilized for constructing buildings, basements, tunnels, subway tunnels, and the like, underground pipes, manholes or other structures which are required to be water proof and method of fabricating or bonding such structural blocks.

Heretobefore, such structures have been fabricated by preliminary applying a suitable binder directly onto the surface of structural blocks or segments or by first assembling the blocks into structures and then injecting binder into the gaps between surfaces to be bonded by means of injectors. However, according to the former method, since said water or other foreign substances often deposit on the bonding surfaces coated with the binder it is difficult to provide perfect bonding. On the other hand, with the latter method, dependent upon the accuracy of assemblage of the structure, dimensional accuracy of respective blocks and conditions under which the binder is applied or water proof treatment is carried out, injection of the binder becomes often impossible. Further, bonding as well as application of water proof treatment are impossible in water. As a result, the shock proof strength of structures fabricated by these prior methods is not sufficiently high.

It is therefore an object of this invention to provide a structural block assembly and a method of fabricating the same which is easy to bond, can obtain perfect bonds and can be readily fabricated in water without accompanying difficulties described above.

According to this invention there is provided a method of fabricating structural blocks comprising the steps of impregnating a flowable binder into an elastic foamed body having continuous cells, interposing the impregnated foam between structural blocks, applying pressure to the foamed body through the blocks to squeeze the impregnated binder out of the foamed body to the gap between surfaces of the blocks to be bonded, and setting the binder to obtain a block structure.

The invention can be more fully understood from the following detailed description when taken in conjunction with the accompanying drawings, in which:

FIG. 3 is an exploded perspective view to explain a method of fabricating a manhole according to this invention;

The elastic foamed body impregnated with a binder and utilized in this invention normally comprises an elastic synthetic resin foamed body having continuous cells which is chemically stable against the binder to be impregnated. Further, as the binder may be used any one of many well known organic or inorganic binders. However, when structures are to be fabricated underground where water is available, it is advantageous to use a hydraulic binder.

Figure 1:
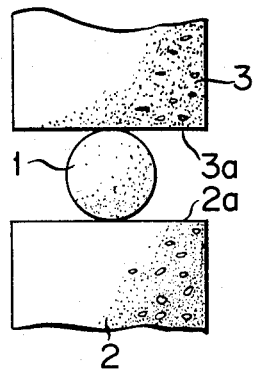
FIG. 1 is a side view of one step of the method of this invention.

Referring now to the accompanying drawings, a solid elastic foamed body having continuous cells dipped in a bath of a semi-flowable organic or inorganic hydraulic binder to completely impregnate the binder throughout the foamed body and the impregnated foamed body is then interposed between bonding surfaces 2a and 3a of structural blocks 2 and 3, as shown in FIG. 1. Then, a pressure is applied to blocks 2 and 3 as shown by arrows to compress the impregnated foamed body to squeeze binder 4 out of the foamed body 1 into a gap between bonding surfaces 2a and 3a until the squeezed out binder uniformly fills the gap. Then the binder is caused to set while the assembly is maintained in the states shown in FIG. 2. After compression, the foamed body from which nearly all of the binder has been squeezed out remains between structural blocks 2 and 3 to act as an elastic back-up member.

With this method such structures as manholes can be readily constructed as shown in FIG. 3.

The bottom member 11 of the manhole comprises a left hand plate 11a, a middle plate 11b and a right hand plate 11c, the right hand edge of the left hand plate 11a, the left hand edge of the middle plate 11b, the right hand edge of the middle plate 11b and the left hand edge of the right hand plate 11c being provided with stepped joint portions 12a, 12b, and 12c. Similarly, the upper surfaces of the left hand plate 11a, the middle plate 11b and the right hand plate 11c are provided with ridges to receive a lower wall member 13. A plurality of foamed bodies 1 are juxtaposed on the joint portions 12a and 12c of left and right hand plates 11a and 11c and these joint portions 12a and 12c of the left and right hand plates 11a and 11c are then suitably aligned with the joint portions 12b of the middle plate 11b. Thereafter, the binder impregnated in the foamed bodies 1 is squeezed out over the entire joint portions 12a, 12b and 12c and then the squeezed out binder is caused to set to bond together the left and right hand plates 11a and 11c and the middle plate 11b. The lower wall member 13 is split into two halves 13a and 13b. A foamed body 1 is applied to joint portion 14 at one end of one half and a foamed body 1 is also applied to the periphery of the ridges of the bottom member 11. The lower wall member 13 is lowered by means of a crane and the like to mount it upon the bottom member 11. Then a gas pipe 15, for example, is lowered to seat it in a notch 16. A plurality of foamed bodies 1 are applied on the upper jointing edge of the lower wall member 13. Split halves 18a and 18b of the upper wall member also applied with a foamed body 1 to the joint portion 19 at one end are lowered on the lower wall member, and the foamed bodies 1 are caused to set to bond upper wall member halves 18a, 18b to the lower wall member halves 13a, 13b. After application of a plurality of foamed bodies 1 to the upper edge of the upper wall member an annular member 21 is mounted thereon and joined thereto. Similarly, after application of foamed bodies 1 on the upper edge 22 of the annular member 21 the lid member 23 is joined to the annular member, said lid member being also split into two halves and being applied with a foamed body 1 at one joint portion 23a.

Figure 4:
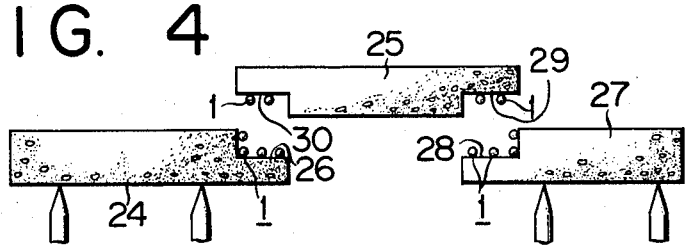
FIG. 4 is a side view to explain a method of constructing a road according to this invention.

Above described method of bonding structural blocks 2 and 3 can also be applied to construct highways. Thus, for example, as shown in FIG. 4, while a second road unit 25 is being mounted upon a first road unit 24 a plurality of foamed bodies impregnated with the binder are applied to stepped joint portions 26 and 28 of the first and third road units 24 and 27 and similar foamed bodies 1 are applied to joint portions 29 and 30 on the opposite sides of the second road unit 25. Thereafter, the second road unit 25 is moved between the first and third road units 24 and 27 so as to align the stepped joint portions 29 and 30 of the second road unit 25 with stepped joint portions 26 and 28 to squeeze the binder out of the foamed bodies 1 to fill the gaps between these joint portions 26, 28, 29 and 30.

Thereafter, water is applied to the squeezed out binder to set it to bond together road units 24, 25 and 27.

Figure 5:
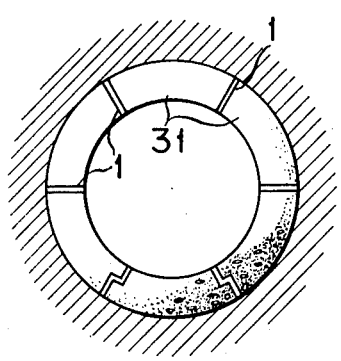
FIG. 5 is a side view to explain a method of fabricating a tunnel according to this invention.
Figure 6:
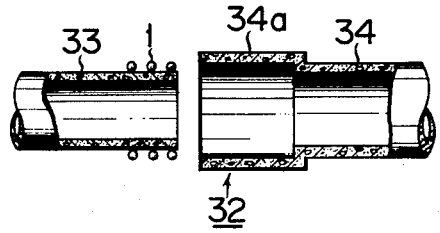
FIGS. 6 and 7 are side views, partly in section, showing a method of jointing gas pipes according to this invention.
Figure 7:
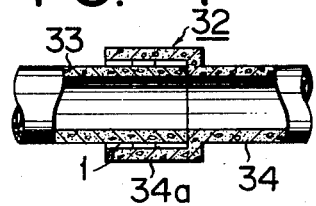

Above described method can also be applied to bond segments 31 to construct a tunnel by the shield tunneling method as shown in FIG. 5. This shield tunneling method is to cut a tunnel through the soft ground with shields or steel cylinders each having a large diameter inserted therein to prevent a possible collapse of the tunnel during the construction. More particularly, elastic foamed bodies impregnated with a binder are similarly interposed between segments 31 to bond them. Further, the method is also applicable to bond underground pipes 32 as shown in FIGS. 6 and 7. In this case, a plurality of elastic foamed bodies impregnated with the binder are applied on the periphery of a first gas pipe 33 and then this end of the pipe is pressed into a joint 34a at one end of a second gas pipe 34 to compress the foamed bodies in the gap between the outer periphery of the first gas pipe 33 and the inner surface of the joint 34a. The binder squeezed out from the foamed bodies is then caused to set by means of moisture to join together both gas pipes 33 and 34.

Figure 2:
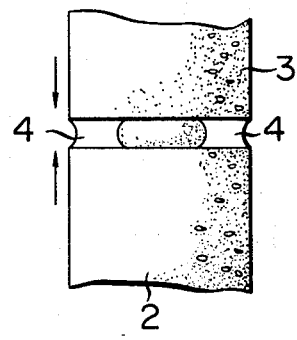
FIG. 2 is a side view of a block assembly fabricated by the method shown in FIG. 1.

Since blocks shown in FIGS. 1 and 2 have flat surfaces 2a and 3a to be joined and the binder in the foamed body 1 is squeezed out when assembled and can not be impregnated again, adjustment of the register of the upper block 3 with the lower block 2 by raising again the block 3 can not be conducted without resulting in some deficiency, i.e., when the upper block 3 is lowered again to the correct position the foamed body which does not contain any appreciable quantity of the binder will be compressed thus resulting in poor bonding owing to the shortage of the binder.

To avoid this problem so as to obtain well bonded water proof assembly of blocks when blocks are reassembled in a manner just described, it is preferable to provide a groove on the bonding surface of a block to receive therein the elastic foamed body impregnated with the binder.

Figure 8:
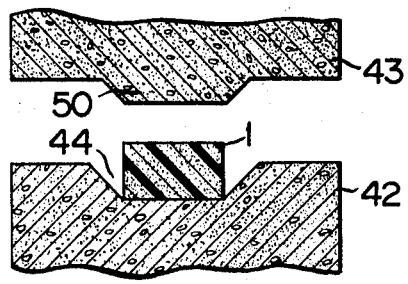
FIG. 8 shows a section of blocks explaining a modified embodiment of this invention.
Figure 9:
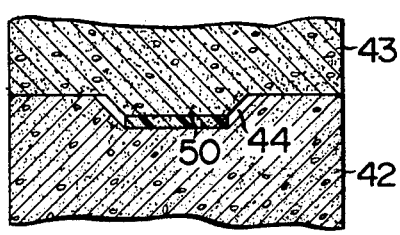
FIG. 9 shows a section of a block assembly bonded by the method shown in FIG. 8.

Thus, for example, a groove 44 having such configuration that can preserve squeezed out binder may be formed on the bonding surface of one of the blocks 42 and 43 to be bonded to receive a foamed body of artificial resin 1 having continuous cells which are impregnated with a flowable binder, as shown in FIG. 8. An upper block 43 formed with a complemental rib 50 is then lowered on the lower block 42, as shown in FIG. 9, to compress the foamed body to squeeze the impregnated binder into the groove 44. With this construction, even if the upper block is raised for reassemblage, the binder retained in the groove can again impregnate the foamed body due to its elasticity. Accordingly, when the upper block is lowered again, the same satisfactory bonding can be obtained as the first time.

Figure 10:
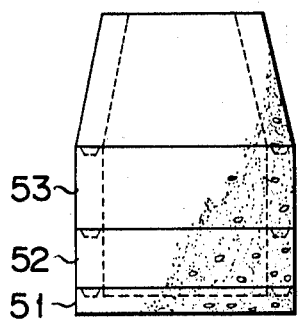
FIG. 10 is a side elevation of a modified manhole fabricated by the method of FIG. 8.
Figure 11:
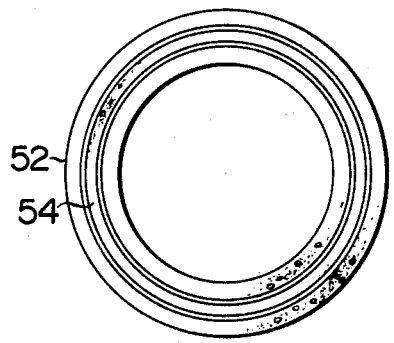
FIG. 11 is a plan view showing blocks utilized to fabricate the manhole shown in FIG. 10.
Figure 12:
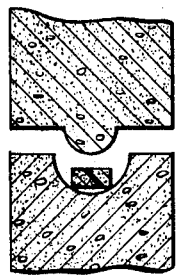
FIGS. 12 to 15 are sectional views illustrating still further modifications of this invention.
Figure 13:
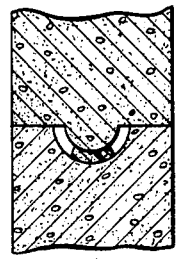
Figure 14:
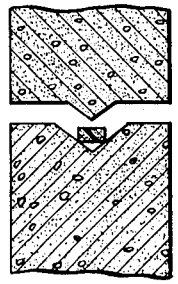
Figure 15:
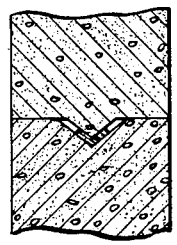

Further, when constructing a manhole as shown in FIG. 10, an annular groove 54 is formed as shown in FIG. 11, on the upper surface of each one of the blocks 51, 52, 53 except the uppermost block. After applying binder impregnated foamed bodies in these grooves 54, as shown in FIG. 8, the blocks are successively assembled. The configuration of the manhole may be square, cylinder or of any other shape.

Further, the configurations of the groove and rib formed on the bonding surfaces of the blocks are not limited to those shown in FIGS. 8 and 9 but may take any other configurations such as semicircular or triangular as shown in FIGS. 12 to 15.

Figure 16:
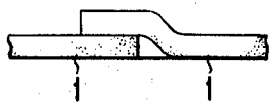
FIGS. 16 and 17 are side views to explain two methods of connecting foamed bodies impregnated with a binder.
Figure 17:

Adjacent ends of binder impregnated foamed bodies 1 can be connected together by mere overlapping as shown in FIG. 16 or opposing ends may be slanted as shown in FIG. 17, so as to provide a continuous layer.

Thus, according to this invention, since blocks are bonded together by means of binder impregnated foamed bodies block assemblies can be provided having strength comparable with that of integrally cast concrete blocks. Proper selection of the dimension of the foamed body and its content of the impregnated binder results in strong bonding having sufficient water proof property over the entire area of the bonding surface. Further, provision of a groove as shown in FIGS. 8 to 15 assures correct aligning and bonding of the assembled blocks. Foamed body is poor in mechanical strength as it is, however, when it is impregnated with a binder, the binder on the surface of the foamed body can be suitably hardened, thus making it easier to carry and handle.

Figure 18:
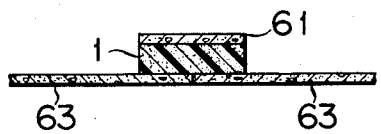
FIGS. 18 to 20 are sectional views to explain the bonding strength of test pieces bonded by utilizing a foamed body impregnated with a binder.
Figure 19:
Figure 20:
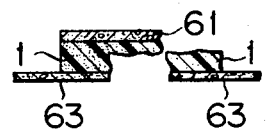

Although it is preferable to make large as far as possible the porosity of the foamed body and hence the quantity of the binder impregnated into the cells, the result of experiment shows that the porosity of from 50 to 90 percent and percentage of impregnation of from 60 to 90 percent give best result. To demonstrate the relationship between the content of the binder and the percentage of compression for an elastic foamed body of a porosity of 80 percent, a vinyl chloride resin plate 61 was bonded to two butt jointed vinyl chloride resin plates 63 by means of the foamed body 1 just mentioned, as shown in FIG. 18 and the bonded assembly was subjected to a tensile test. The result is shown in table I below. In this table symbol *a* represents samples which were broken as shown in FIG. 19, that is the upper vinyl chloride resin plate was severed and *b* samples wherein the foamed body alone was ruptured. The binder utilized in this test had a normal tensile strength of 170 Kg/cm$^2$ after setting.

TABLE I

| Quantity impregnated % | | Percentage of compression | | |
|---|---|---|---|---|
| | | 0 | 45 | 90 |
| 100 | strength Kg/cm$^2$ | 128 | 103 | 86 |
| | condition of rupture | a | a | a |
| 75 | strength Kg/cm$^2$ | 23 | 98 | 92 |
| | condition of rupture | b | a | a |
| 50 | strength of Kg/cm$^2$ | 21 | 25 | 83 |
| | condition of rupture | b | b | a |
| 25 | strength of Kg/cm$^2$ | 6 | 20 | 79 |
| | condition of rupture | b | b | a |

The test result shown in this table shows that:

1. Percentage of impregnation of less than 100 percent after compression results in the rupture *b*. This is because the binder has collected in the lower portion of the elastic foamed body to leave many unfilled cells in the upper portion.

2. In the case of the percentage of impregnation of more than 100 percent (that is when the impregnated binder is surplus), smaller percentage of compression is more advantageous. It is believed that this is caused by the volume ratio of the binder to the elastic body after setting.

Thus this invention provides a method of fabricating structural blocks which is more easy to carry out and can provide stronger joints than is possible with the prior method. Moreover, since the structural blocks are bonded together with binder impregnated foamed bodies interposed therebetween, the foamed body acts as a back-up member after assemblage to absorb shocks and vibrations acting on the assembled structure. Further, as the foamed body is made of an elastic body containing continuous cell it is possible to impregnate it with the binder merely by dipping. Consequently when blocks are fabricated the impregnated binder will be squeezed out uniformly throughout the gap between bonding surfaces thus assuring uniform and positive bonding. After setting there is not hardened binder remaining in the elastic member so that it can not only provide sufficient elasticity required for acting as a back-up member but also the tendency of becoming brittle can be avoided.

Where elastic joints are required, a binder which manifests elasticity after setting may be used.

What is claimed is:

1. A method of fabricating structural blocks comprising the steps of:
   a. completely impregnating throughout an elastic foamed body a fluid flowable binder in such a manner that the volume ratio of said fluid binder to said foamed body is between 6:4 to 9:1, said foamed body having continuous cells and a porosity of 50 to 90 percent;
   b. interposing said binder-impregnated foamed body between structural blocks;
   c. compressing said foamed body between said blocks with sufficient pressure to squeeze substantially all of said impregnated binder out of said foamed body and onto the surface of said blocks; and
   d. causing said squeezed out binder to set so as to bond said structural blocks together, while said foamed body is under compression, said depleted foamed body remaining in place due to its elasticity serving to absorb shocks and vibrations.

2. A method according to claim 1, wherein the foamed body is interposed between a groove of one of said blocks and a complimentary rib on the other of said blocks.

* * * * *